United States Patent
Yadav et al.

(10) Patent No.: US 8,990,892 B2
(45) Date of Patent: Mar. 24, 2015

(54) ADAPTING EXTENSIBLE AUTHENTICATION PROTOCOL FOR LAYER 3 MESH NETWORKS

(75) Inventors: Navindra Yadav, Cupertino, CA (US); Atul Mahamuni, Fremont, CA (US); Jonathan Hui, Foster City, CA (US); Alec Woo, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 518 days.

(21) Appl. No.: 13/176,857

(22) Filed: Jul. 6, 2011

(65) Prior Publication Data

US 2013/0014217 A1    Jan. 10, 2013

(51) Int. Cl.
*H04L 29/06* (2006.01)
*H04W 12/06* (2009.01)

(52) U.S. Cl.
CPC ........... *H04L 63/0884* (2013.01); *H04W 12/06* (2013.01)
USPC ............................................. 726/3; 713/168

(58) Field of Classification Search
None
See application file for complete search history.

(56) References Cited

U.S. PATENT DOCUMENTS

| | | | |
|---|---|---|---|
| 6,651,242 B1* | 11/2003 | Hebbagodi et al. | 717/127 |
| 7,221,750 B2 | 5/2007 | Brahmbhatt et al. | |
| 8,023,478 B2* | 9/2011 | Cam-Winget et al. | 370/338 |
| 8,069,475 B2* | 11/2011 | Dharanikota et al. | 726/7 |
| 8,270,382 B2* | 9/2012 | Cam-Winget et al. | 370/338 |
| 8,473,736 B2* | 6/2013 | Gamer et al. | 713/156 |
| 2005/0120213 A1 | 6/2005 | Winget et al. | |
| 2005/0223111 A1* | 10/2005 | Bhandaru et al. | 709/236 |
| 2006/0041742 A1* | 2/2006 | Oba | 713/151 |
| 2006/0126845 A1* | 6/2006 | Zheng | 380/270 |
| 2006/0179474 A1* | 8/2006 | Bichot | 726/3 |
| 2006/0209705 A1 | 9/2006 | Sauter et al. | |
| 2006/0212928 A1* | 9/2006 | Maino et al. | 726/4 |
| 2006/0259759 A1* | 11/2006 | Maino et al. | 713/151 |
| 2007/0206537 A1* | 9/2007 | Cam-Winget et al. | 370/331 |
| 2008/0034407 A1 | 2/2008 | Sauter et al. | |

(Continued)

FOREIGN PATENT DOCUMENTS

WO    WO 2010049138 A1 *    5/2010    ............ H04L 29/06

OTHER PUBLICATIONS

Sbeiti, et al., "PASER: Position Aware Secure and Efficient Route Discovery Protocol for Wireless Mesh Networks," The Fifth International Conference on Emerging Security Information, Systems and Technologies—Securware, Nice, France, Aug. 2011, 8 pages.
Gardner-Stephen, "The Serval Project: Practical Wireless Ad-Hoc Mobile Telecommunications," Jul. 22, 2011, retrieved from http://developer.servalproject.org/files/CWN_Chapter_Serval.pdf, 29 pages.

(Continued)

*Primary Examiner* — Michael R Vaughan
(74) *Attorney, Agent, or Firm* — Edell, Shapiro & Finnan, LLC

(57) ABSTRACT

Techniques are provided for adaptive routing of authentication packets in a network, such as a wireless mesh network. At an authenticated device in the network, an authentication packet is received over the network from a device that is seeking authentication. The authentication packet is encapsulated for transmission in Layer 3 packets over an Internet Protocol (IP) tunnel to an authenticator device associated in the network. Similarly, for an authentication packet encapsulated in Layer 3 packets from the authenticator device over the IP tunnel, the authentication packet is decapsulated from the Layer 3 packets and transmitted over the network to the device seeking authentication.

24 Claims, 6 Drawing Sheets

(56) References Cited

U.S. PATENT DOCUMENTS

| | | | |
|---|---|---|---|
| 2009/0172398 A1* | 7/2009 | Falk et al. | 713/168 |
| 2010/0180318 A1 | 7/2010 | Salowey et al. | |
| 2010/0290622 A1* | 11/2010 | Garcia Morchon et al. | 380/273 |
| 2011/0083160 A1 | 4/2011 | McRae et al. | |
| 2012/0008787 A1* | 1/2012 | Wan et al. | 380/285 |
| 2012/0066492 A1* | 3/2012 | Gamer et al. | 713/156 |
| 2012/0209951 A1* | 8/2012 | Enns et al. | 709/217 |
| 2012/0259988 A1* | 10/2012 | Erringer | 709/228 |
| 2013/0212394 A1* | 8/2013 | Chai et al. | 713/171 |

OTHER PUBLICATIONS

Zigbee Alliance, "ZigBee 1.0 Security Overview," 2005, retrieved Jul. 29, 2013, from https://docs.zigbee.org/zigbee-docs/dcn/05/docs-05-3411-00-00mg-3559-053411r000zb-members-zigbee-security-layer-technical-overview-pdf.pdf, 35 pages.

Sbeiti, et al., "PASER: Position Aware Secure and Efficient Mesh Routing Protocol," Keying and Authentication for Routing Protocols, Internet-Draft, Nov. 8, 2012, retrieved from http://tools.ietf.org/html/draft-sbeiti-karp-paser-00, 37 pages.

Hui, et al., "Securing the 802.15.4 Network Access—802.1x over 802.15.4," Project: IEEE P802.15 Working Group for Wireless Personal Area Networks (WPANs), May 11, 2011, 12 pages.

* cited by examiner

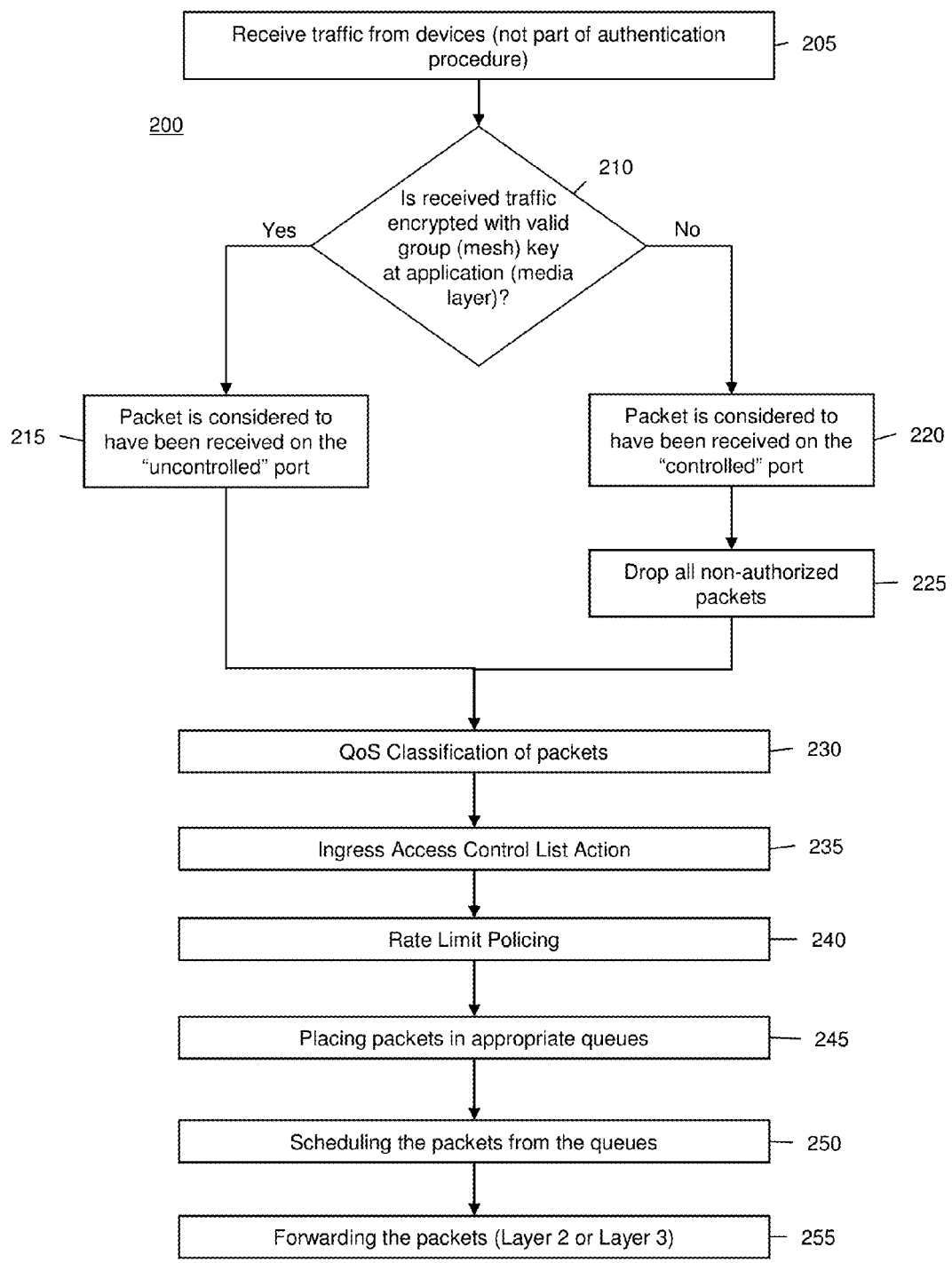

ADAPTING EXTENSIBLE AUTHENTICATION PROTOCOL FOR LAYER 3 MESH NETWORKS

TECHNICAL FIELD

The present disclosure relates to authenticating wireless devices that are part of a mesh network.

BACKGROUND

Low-Power Lossy Networks (LLNs) may be used in a variety of applications, including intelligent power distribution networks, so called "Smart Grid" applications. Due to the embedded nature of LLNs, they are typically deployed in public and uncontrolled environments. For this reason, implementing strong security in LLNs is an application requirement.

The IEEE 802.1X standard provides a method for network access control. An IEEE 802.1X authentication involves three entities:

Supplicant: a device that wishes to join a network.

Authenticator: a network device (i.e., switch or access point) that a Supplicant communicates with to gain access to the network.

Authentication Server: a device that the Authenticator communicates with to validate the credentials of a Supplicant.

In traditional networks, the Supplicant and Authenticator are in direct link-layer communication. For example, in Ethernet switched networks, the access switch (regardless of whether it is running as a Layer 2 or Layer 3 switch) terminates the authentication exchange with the end host. In 802.11 (WiFi) wireless networks the access point terminates the authentication exchange when running in autonomous mode.

BRIEF DESCRIPTION OF THE DRAWINGS

FIG. 7 is an example flow chart depicting operations performed by an authenticated device based on whether the packets are encrypted with a group mesh key.

DESCRIPTION OF EXAMPLE EMBODIMENTS

Overview

Techniques are provided for the controlled adaptive routing of authentication packets in a network. At an authenticated device in the network, an authentication packet is received over the network from a device that is seeking authentication. The authentication packet is encapsulated for transmission in Layer 3 packets over an Internet Protocol (IP) tunnel to an authenticator device associated with the network. Similarly, for an authentication packet encapsulated in Layer 3 packets received from the authenticator device over the IP tunnel, the authentication packet is decapsulated from the Layer 3 packets and transmitted over the network to the device seeking authentication.

Example Embodiments

The following techniques are useful to allow low-power lossy network (LLN) devices to efficiently and effectively negotiate network access with an authenticator device. The foregoing is described with reference to IEEE 802.1X, which is an IEEE standard for port-based network access control. The IEEE 802.1X standard is part of the IEEE 802.1 group of networking protocols. It provides an authentication mechanism to devices seeking to attach to a local area network (LAN) or wireless LAN (WLAN). IEEE 802.1X defines the encapsulation of the Extensible Authentication Protocol (EAP) over IEEE 802 which is known as "EAP over LAN" or EAPOL. However, the references to IEEE 802.1X herein are only an example and the techniques described herein are not limited to IEEE 802.1X.

IEEE 802.1X was originally developed for wired LANs to prevent unauthorized use in open environments such as university campuses. IEEE 802.1x was later adapted for use in 802.11 WLANs and is widely deployed with IEEE 802.11i based WLANs. The IEEE 802.1X framework provides a means to block end station access until authentication is successful, thereby controlling access to WLAN resources. The port associated with the mesh end station is a logical port or association and not a physical port.

The 802.1X negotiation requires the Supplicant and Authenticator to exchange a significant number of messages as part of the authentication procedure. The authentication negotiation and temporal key negotiation handshakes require at least 18 messages assuming small X.509 certificates. For an Advanced Meter Infrastructure (AMI) deployment where 5000 or more devices communicate through a single Field Area Router on a several hundred kbps radio link, the communication overhead is non-trivial. When multiple devices are requesting network access, care needs to be taken to avoid saturating the link. Furthermore, an Authenticator needs to take into account the dynamic link characteristics and lossy nature of LLNs to efficiently and effectively negotiate network access.

Figure 1:
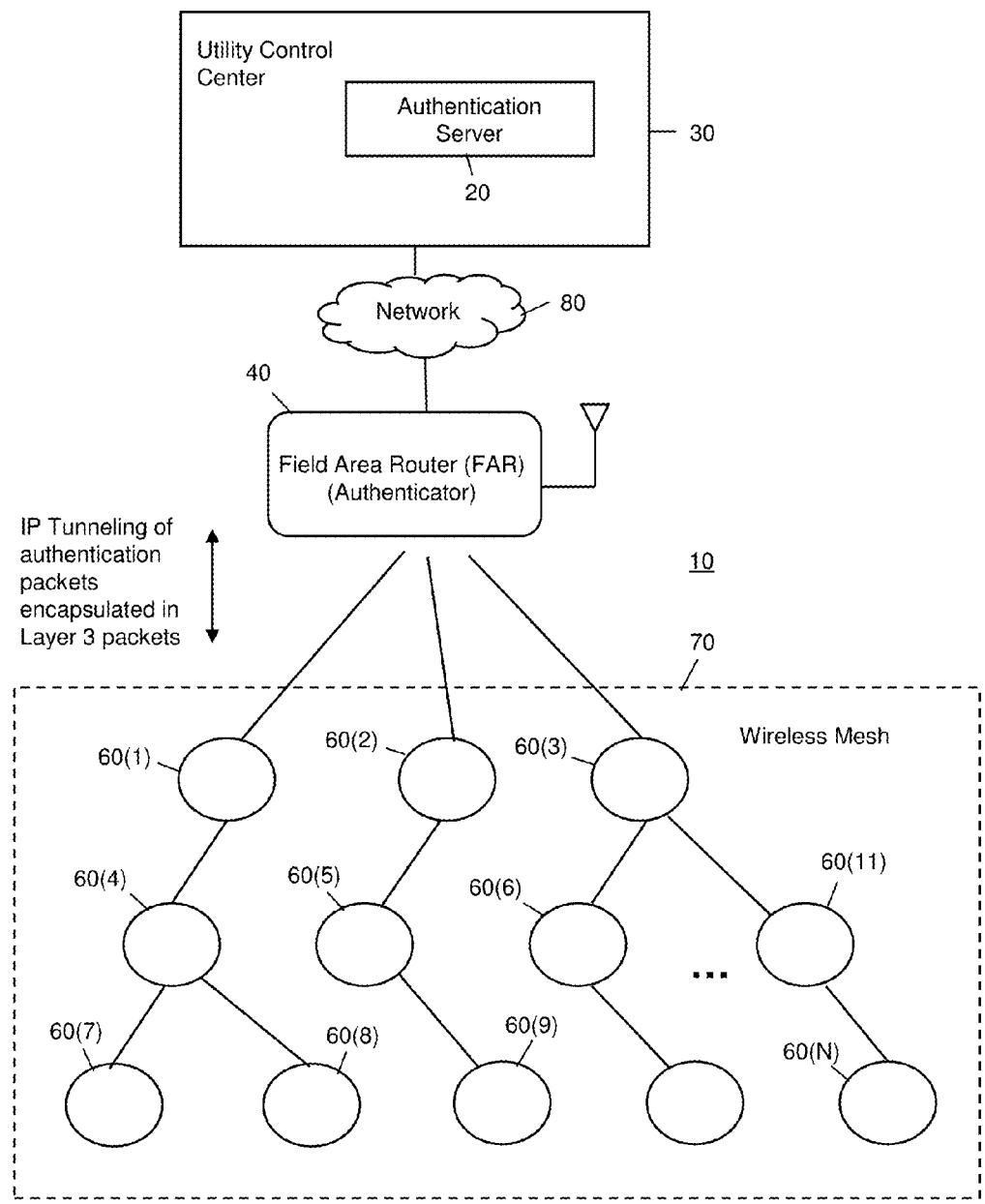
FIG. 1 is an example of a block diagram depicting a low-power lossy network in which an authenticator device is configured to perform adapted routing of authentication packets in a network.

Referring to FIG. 1, a block diagram is described that shows an example of a LLN 10 in which authenticated wireless devices are configured to perform tunneling of authentication packets as part of an authentication procedure in connection with other wireless devices. The LLN 10 comprises an authentication server 20 that may be resident in a utility control center 30, a Field Area Router (FAR) 40 and a plurality of wireless node devices 60(1)-60(N). The wireless devices 60(1)-60(N) are part of a "mesh" of wireless devices. The wireless mesh is shown at reference numeral 70 and is, for example, an IEEE 802.15.4 wireless mesh. IEEE 802.15.4 is an IEEE standard that specifies the physical layer and media access control for low-rate wireless personal area networks (LR-WPANs). The FAR 40 communicates with the authentication server 20 by way of the network 80.

The FAR 40 provides wide area network (WAN) connectivity for the wireless devices 60(1)-60(N) in the LLN 10 and hosts the authentication functions. In so doing, the FAR 40 communicates with the authentication server 20 to verify the identity of the device seeking authentication as part of the authentication process. The FAR 40 also serves as an enforcement point and drops all link frames that are not protected using the keying material, unless such link frames are part of the network access control negotiation from a joining wireless device. There may be multiple FARs in a given LLN and for simplicity only a single FAR 40 is shown, but it is to be understood that this is by way of example only.

Examples of uses for the following techniques are utility (e.g., power) distribution system deployments, such as the Advanced Meter Infrastructure (AMI) utility networks. In a utility network deployment, the wireless devices 60(1)-60(N) are meter devices, routers, switches and other power distribution or telemetry devices that are remotely controlled by a suitable management server (not shown in FIG. 1). Before these devices can actively participate in these power distribution and telemetry functions, they need to be authenticated. Authentication involves an exchange of authentication messages (packets) between the wireless device to be authenticated and the FAR 40. The FAR 40 serves as an Authenticator or Authenticator Device.

Authenticated Devices are wireless devices are that have already been authenticated and gained network access from a FAR to obtain link-layer keying material. Authenticated Devices also serve as enforcement points and drop all link frames that are not protected using the keying material, unless such link frames are part of the network access control negotiation from a Joining Device. The FAR 40 may also be considered an Authenticated Device.

Joining Devices are wireless devices that are seeking/requesting authentication for network access. Such devices may communicate directly with the FAR 40 or through an Authenticated Device. The Authenticated Device serves as a proxy for IEEE 802.1X negotiations. Depending on the location of the wireless device, it may be one hop, two hops, three hops, etc., from the FAR 40. For example, in FIG. 1, wireless devices 60(1), 60(2) and 60(3) are all one hop from the FAR 40, wireless devices 60(4), 60(5), 60(6) and 60(11) are all two hops from the FAR 40, and wireless devices 60(7), 60(8), 60(9) and 60(10) are all three hops from the FAR 40.

While the techniques presented herein are described in connection with a wireless LLN (e.g., a wireless mesh network), this is only an example and not meant to be limiting. LLNs are not necessarily constrained to wireless networks and can also apply to wired environments. For example, Power Line Communication technology is a wired connectivity technology that exhibits many of the same characteristics as wireless mesh networks (relatively high loss rates compared to traditional link technologies used in IP networks, time-varying link qualities and interference, and a communication medium that is not a single broadcast domain, etc.). In general, an LLN refers to any network that communicates over links that exhibit higher loss rates than a typical Ethernet-based network and connectivity is not well-defined by physical connections. Thus, the techniques described herein are applicable to wireless and wired network environments.

It is possible that a device that is in the process of being authenticated does not yet have a routable Internet Protocol (IP) address, e.g., an IPv6 address, assigned to it. If the wireless device does not have a routable IPv6 address, then messages cannot directly be exchanged between the FAR 40 (Authenticator) and the device if it is more than one hop from the FAR. This would apply to devices 60(4)-60(N) in the example shown in FIG. 1.

In order to solve this challenge, the authentication messages, e.g., EAP messages, to and from the device to be authenticated, are tunneled over a Layer 3, e.g., an IPv6, tunnel. The first hop mesh node (an authenticated device) encapsulates the authentication packets from the mesh node being authenticated and sends the encapsulated authentication packets to the FAR 40. In the reverse direction, the last authenticated device in the chain from the FAR 40 decapsulates the authentication packets from the FAR router and sends them to the adjacent device that is being authenticated. By proxying the authentication messages, a Supplicant does not change its behavior depending on whether it is in direct communication range of the Authenticator (FAR) or an Authenticated Device. As explained further hereinafter, EAP packets can be tunneled on top of Universal Datagram Protocol (UDP) packets or Transmission Control Protocol (TCP) packets. The TCP adds reliability, but also adds retransmission overhead. The choice between the two can be made based on the reliability of frame delivery in the network.

Figure 2:
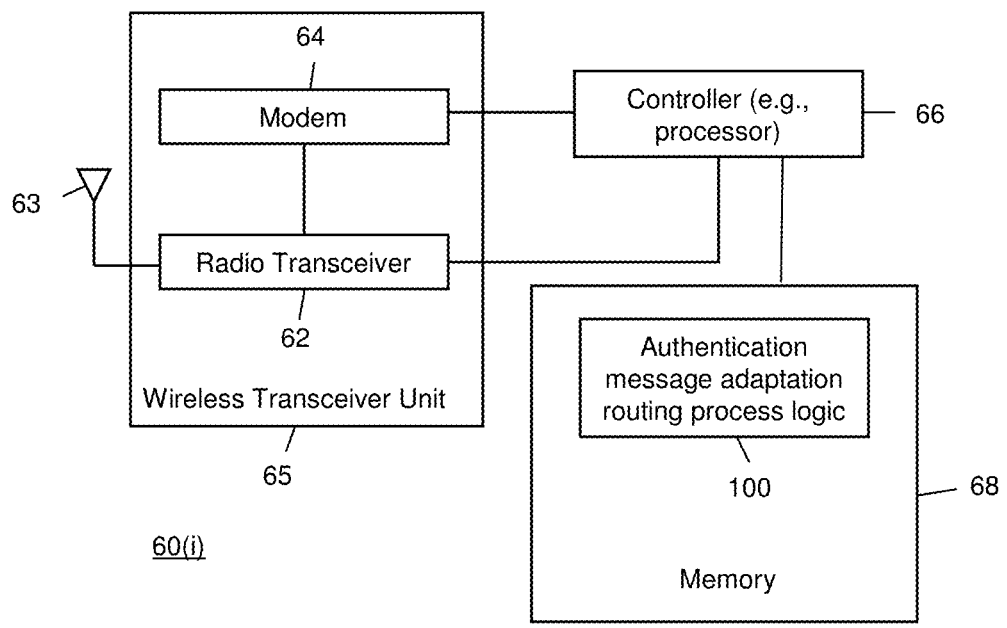
FIG. 2 is an example of a block diagram of a device configured to perform adapted routing of authentication packets.

Reference is now made to FIG. 2 for a description of an example of a block diagram of a device, generically referred to at reference numeral 60($i$) in FIG. 2, that is configured to perform the authentication message routing adaptation functions described above. The wireless device 60($i$) comprises a radio transceiver 62, at least one antenna 63, a modem 64, a controller 66 and a memory 68. In one example, the radio transceiver 62 and modem 64 comprise one or more integrated circuit chips that are configured to perform wireless communication in accordance with the IEEE 802.15.4 WPAN communication protocol to communicate with other wireless devices in the mesh 70 and with the FAR 40. The radio transceiver 62 and modem 64 may be considered parts of a wireless transceiver unit 65. The controller 66 is a data processor, e.g., a microprocessor or microcontroller, that is configured to execute software instructions stored in memory 68. In the case in which the LLN is a wired network, then the wireless transceiver unit 65 is a transceiver unit comprising a transceiver 62 and a modem 64 that are configured for wired communication over a wired (copper or optical) network media.

The memory 68 may comprise read only memory (ROM), random access memory (RAM), magnetic disk storage media devices, optical storage media devices, flash memory devices, electrical, optical, or other physical/tangible memory storage devices. The memory 68 stores computer executable software instructions for authentication message routing adaptation process logic 100. The authentication message routing adaptation process logic 100 comprises software instructions that cause the controller 66 to perform the encapsulating and decapsulating of authentication (e.g., EAP) messages as described herein. Thus, in general, the memory 68 may comprise one or more tangible computer readable storage media (e.g., a memory device) encoded with software comprising computer executable instructions and when the software is executed (by the controller 66) it is operable to perform the operations described herein in connection with process logic 100.

FIG. 2 thus depicts, in one form, an apparatus comprising a transceiver unit configured to transmit and receive signals over a network, and a processor coupled to the transceiver unit, where the processor is configured to, for an authentication packet received from a device that is seeking authentication in the network, encapsulate the authentication packet for transmission in Layer 3 packets over an Internet Protocol (IP) tunnel to an authenticator device associated in the network. Similarly, FIG. 2 depicts, in another form, one or more computer readable storage media encoded with software comprising computer executable instructions and when the software is executed operable to, for an authentication packet received from a device that is seeking authentication in a network, encapsulate the authentication packet for transmission in Layer 3 packets over an Internet Protocol (IP) tunnel to an authenticator device associated in the network.

Figure 3:
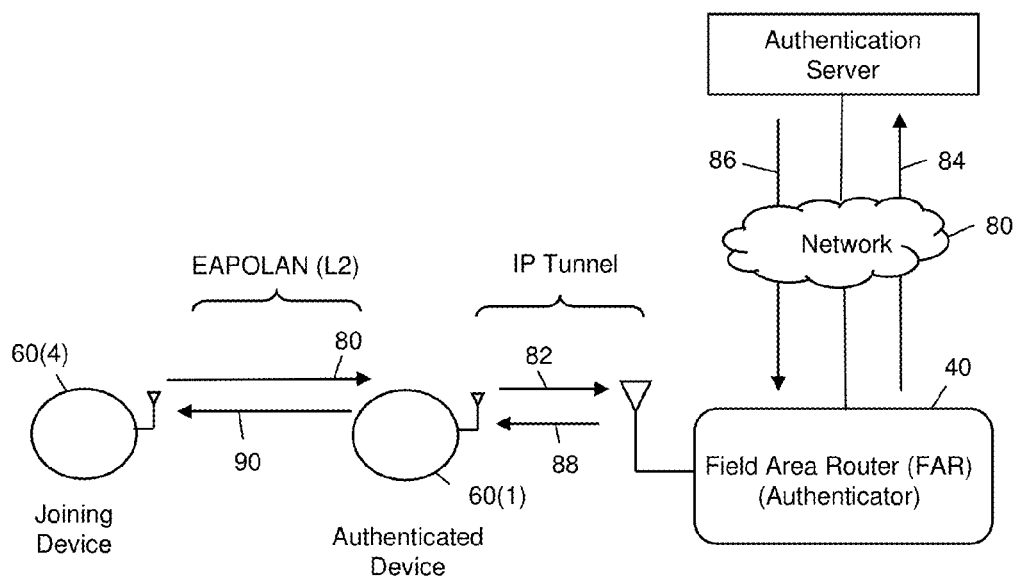
FIG. 3 is an example network topology diagram showing an authenticated device encapsulating an authentication packet for transmission in Layer 3 packets over an Internet Protocol (IP) tunnel.

Reference is now made to FIG. 3 for a general description of the operations performed by an authenticated device when handling authentication messages on behalf of a wireless device seeking authentication. Any device in the network is configured to perform the operations associated with the authentication message routing adaptation process logic 100. However, the device performs these operations only when it is authenticated.

In the example shown in FIG. 3, the wireless device 60(1) is an authenticated wireless device in the mesh and the wireless device seeking authentication is wireless device 60(4), which is one hop from the authenticated wireless device 60(1). When the wireless device 60(4) seeks to be authenticated, at 80, it wirelessly transmits an authentication start packet over the wireless network, e.g., an EAPOLAN packet, to the neighbor wireless device that is authenticated, which in this example is wireless device 60(1). The authentication start packet is sent as a Layer 2 message because, at this point, the wireless device does not have a Layer 3, e.g., IP, address, since it is not yet authenticated. This is in contrast to the techniques according to the Protocol for Carrying Authentication for Network Access (PANA), which specifies a similar behavior but authentication messages are sent at Layer 3. This is not a preferable approach because PANA requires enabling some network layer features before allowing link-layer access. In the techniques of the present disclosure, the authenticated wireless device 60(1) serves as an 802.1X authenticator relay/split authenticator in that, at 82, it receives the Layer 2 (EAPOLAN) authentication packet and encapsulates it for transmission in Layer 3 packets over an IP tunnel to the FAR 40 (Authenticator). The FAR 40 receives the authentication start packet encapsulated in the Layer 3 packets and forwards the authentication start packet to the authentication server 20 for processing as part of an authentication procedure. At 86 the authentication server 20 will return an authentication request message/packet to the FAR 40. In the reverse direction, for authentication packets sent from the FAR 40 destined for the wireless device 60(4), at 88, the authenticated wireless device 60(1) receives the authentication packet encapsulated in Layer 3 packets from the FAR 40 (Authenticator) over the IP tunnel, decapsulates the authentication packet from the Layer 3 packets and at 90, wirelessly transmits the authentication packet (e.g., EAPOLAN) over the wireless network to the wireless device 60(4). This process repeats for authentication packet exchanges between the wireless device 60(4) and the FAR 40 in the course of the authentication procedure until the wireless device 60(4) is authenticated or not.

The encapsulating operation of the Layer 2 authentication packet into Layer 3 packets may involve encapsulating the authentication packet in UDP packets or in TCP packets. The EAP packets can be tunneled over UDP or TCP. The TCP adds reliability but also adds retransmission overhead. The choice to use UDP or TCP may be based on the reliability desired.

Figure 4:
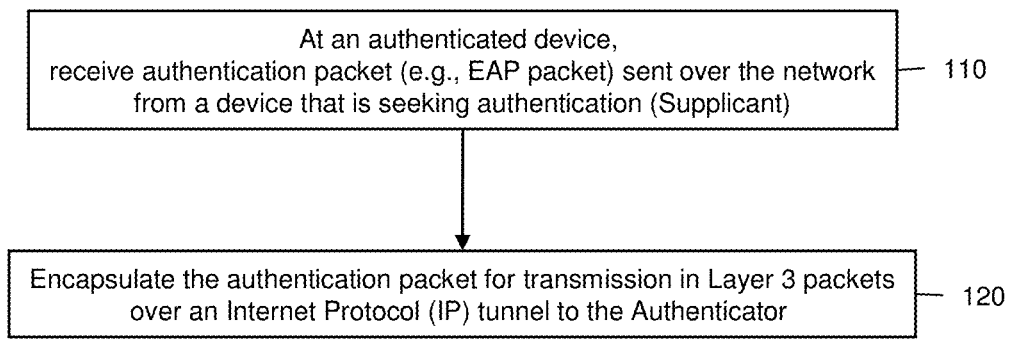
FIG. 4 is an example flow chart depicting operations performed to encapsulate authentication packets received from a device seeking authentication for transmission in Layer 3 packets over an IP tunnel to an Authenticator.

Referring now to FIG. 4, the operations of the authentication message routing adaptation process logic 100 are now described in connection with authentication messages received at an authenticated device from a device seeking authentication. As is known in the art, in a wireless mesh network, a wireless device seeking authentication will monitor the wireless channel to detect a Beacon from a neighboring wireless device. Only authenticated wireless devices will transmit Beacons. When it detects a Beacon from an authenticated wireless device, the wireless device seeking authentication will transmit an authentication start packet/message. During the authentication procedure, the wireless device seeking authentication will receive authentication packets/messages from the FAR 40 (Authenticator) and will transmit an authentication message/packet in response. Thus, at 110, the authenticated device receives an authentication packet from the device seeking authentication, the Supplicant. At 120, the authenticated device encapsulates the authentication packet for transmission in Layer 3 packets over an IP tunnel to the FAR 40 (Authenticator).

Figure 5:
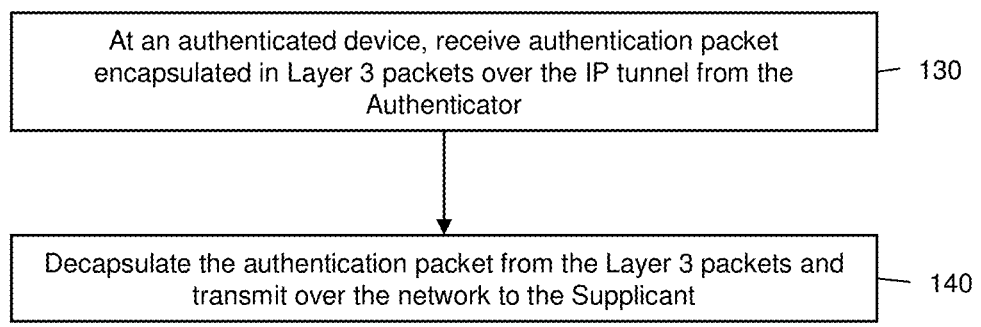
FIG. 5 is an example flow chart depicting operations performed to decapsulate authentication packets received from the Authenticator for transmission to a device seeking authentication.

FIG. 5 shows a flow chart for the operations performed by the authenticated device for packets in the reverse direction. At 130, the authenticated device receives the authenticated packet encapsulated in Layer 3 packets over the IP tunnel from the FAR 40 (Authenticator). At 140, the authenticated device decapsulates the authenticated packet from the Layer 3 packets and transmits it over the network to the device seeking authentication, the Supplicant.

Figure 6:
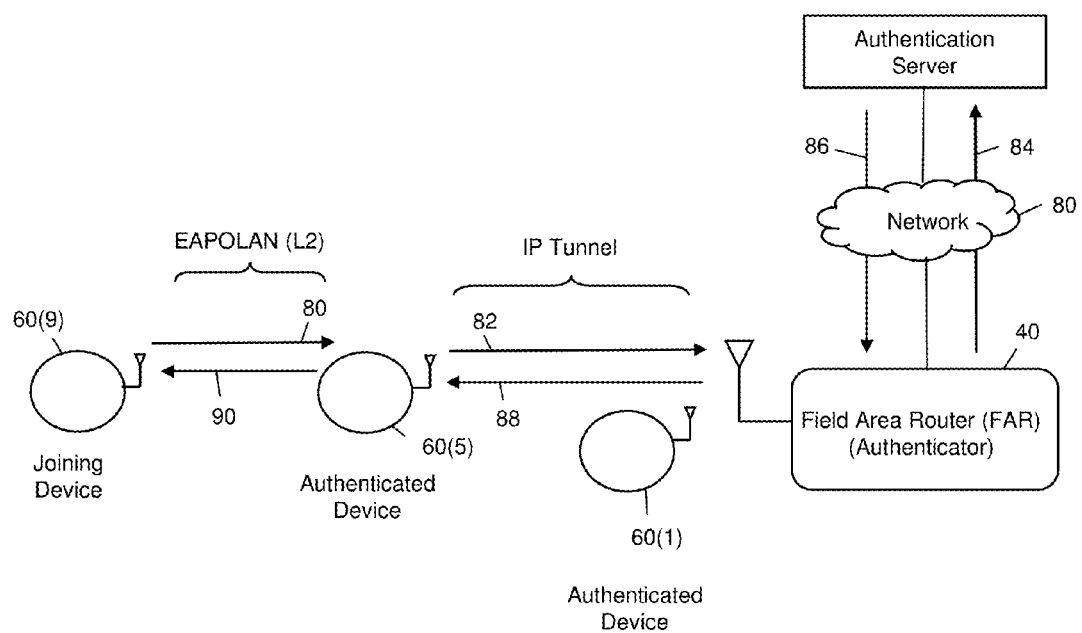
FIG. 6 is an example network topology diagram showing an authenticated device that encapsulates an authentication packet for transmission in Layer 3 packets over an IP tunnel that is two hops from the Authenticator.

Reference is now made to FIG. 6. FIG. 6 is a diagram similar to FIG. 3 but showing that the authenticated wireless device that performs the techniques described herein may be more than one hop from the Authenticator. For example, wireless device 60(5) is the authenticated device that directly communicates with the device seeking authentication, e.g., wireless device 60(9). In this example, the authenticated device 60(5) receives authentication packets from the device 60(9), encapsulates them in Layer 3 packets and transmits them over an IP tunnel directly to the FAR 40. Similarly, the device 60(5) decapsulates the Layer 3 packets to recover the authentication packets and sends them wirelessly over the wireless network to device 60(9).

As shown in FIG. 6, in a mesh network the Authenticator and Supplicant need not be Layer 2 adjacent to each other. That is, there may be multiple Layer 3 and Layer 2 hops between the Authenticator and Supplicant. Pairwise encryption between the Authenticator and Supplicant is not used to encrypt the data traffic sent between these points. This is unlike the scenario common in an enterprise or commercial deployment of WiFi™ (IEEE 802.11i/r). In the case of a WiFi network deployment, unicast traffic is encrypted and the pairwise transient traffic encrypting key is shared between the Access Point and the wireless end point. In the case of an IEEE 802.15.4-based mesh, the architecture makes use of group keys to protect the traffic from outsiders.

A symmetric Group Key (Mesh Key) is used to protect data at the media layer that is exchanged between authenticated devices in the network and the FAR. Authenticated devices know the Mesh Key and this is leveraged to implement logical uncontrolled and controlled ports of IEEE 802.1x. Each hop in the network validates if the traffic that it has received has been encrypted and integrity protected with a valid mesh key (or keys in case of key transition). If the message (frame over the media) has been protected with a valid key, the frame is considered to have been received on the uncontrolled port. If the frame is in the clear (not encrypted with the mesh key), it is treated as if it has been received on the controlled port.

Turning now to FIG. 7, a diagram is shown for a process 200 performed in an authenticated device with respect to traffic (not authentication packet traffic) received by the authenticated device. A group mesh key is forwarded by the Authenticator (FAR 40) to an authenticated device when it has authenticated the device. Again, the group mesh key is known only to authenticated devices in the network and used for protecting packets at an application layer. At 205, an authenticated device in the mesh receives traffic from another device. At 210, the device evaluates the received traffic to determine whether it is encrypted with a valid group (mesh) key at the application (media) layer. When it is determined that the traffic is encrypted with a valid mesh key, then at 215, the packet so encrypted is said to have been received on a logical "uncontrolled" port. When it is determined that received packets are not encrypted at the application layer with the group mesh key, then at 220, the packet is said to have been received on a logical "controlled" port. Then, at 225, the non-authorized packet is dropped.

At 230, the packets (received on the uncontrolled port) are classified according to their quality of service (QoS). At 235, access control list action is performed on ingress packets. At 240, any rate limiting polices are applied to the packets. At 245, packets are placed in appropriate queues. At 250, packets are scheduled for output from the queues. At 255, packets are forwarded from the device according to Layer 2 or Layer 3 routing.

In sum, techniques are provided involving, at an authenticated device in a network, receiving an authentication packet sent over the network from a device that is seeking authentication; and encapsulating the authentication packet for transmission in Layer 3 packets over an Internet Protocol (IP) tunnel to an authenticator device associated in the network. In the reverse direction, at the authenticated device in a network, an authentication packet is received that is encapsulated in Layer 3 packets from the authenticator device over the IP tunnel; and the authenticated device decapsulates the authentication packet from the Layer 3 packets and transmits the authentication packet over the network to the device seeking authentication.

The above description is intended by way of example only.

What is claimed is:

1. A method comprising:
   at an authenticated device in a wireless mesh network, receiving a Layer 2 authentication packet sent over the network from a device that is seeking authentication;
   determining a reliability of transmission in the wireless mesh network;
   selecting a retransmission protocol based on the determined reliability; and
   encapsulating, according to the selected retransmission protocol, and encrypting the authentication packet using a group mesh key into Layer 3 packets for transmission over an Internet Protocol (IP) tunnel to an authenticator device associated in the network, wherein the IP tunnel includes at least one intermediate authenticated device that is configured to drop authentication packets not encrypted with the group mesh key.

2. The method of claim 1, wherein the device that is seeking authentication behaves the same as if it were communicating directly with the authenticator device.

3. The method of claim 1, wherein encapsulating comprises encapsulating the authentication packet using the IP address of the authenticated device.

4. The method of claim 1,
   further comprising:
   transmitting the authentication packet over the IP tunnel across a plurality of intermediate hops to the authenticator device, wherein the plurality of intermediate hops includes the intermediate authenticated device and at least one other authenticated device.

5. The method of claim 1, and further comprising transmitting the Layer 3 packets encapsulating the authentication packet over an IPv6 tunnel to the authenticator device.

6. The method of claim 5, wherein receiving comprises receiving the authentication packet in a wireless signal transmitted from the device seeking authentication, and wherein transmitting comprises wirelessly transmitting the Layer 3 packets to the authenticator device.

7. The method of claim 1, and further comprising receiving an authentication packet encapsulated in Layer 3 packets from the authenticator device over the IP tunnel, decapsulating the authentication packet from the Layer 3 packets and transmitting the authentication packet over the network to the device seeking authentication.

8. The method of claim 1, and further comprising forwarding the group mesh key to the device from the authenticator device when the authenticator device has authenticated the device, the group mesh key being known only to authenticated devices in the network and used for protecting packets at an application layer.

9. A method comprising:
   at an authenticated device in a wireless mesh network, receiving a Layer 2 authentication packet that is encapsulated in Layer 3 packets from an authenticator device over an Internet Protocol (IP) tunnel, wherein the IP tunnel includes at least one intermediate authenticated device configured to drop authentication packets not encrypted with the group mesh key; and
   decapsulating and decrypting the authentication packet using a group mesh key from the Layer 3 packets and transmitting the authentication packet over the network to a device seeking authentication,
   wherein receiving the Layer 2 authentication packet comprises receiving the Layer 3 packets encapsulated according to a selected retransmission protocol, the retransmission protocol previously selected according to a determined reliability of transmission in the wireless mesh network.

10. The method of claim 9, wherein the device that is seeking authentication behaves the same as if it were communicating directly with the authenticator device.

11. The method of claim 9, wherein receiving comprises receiving the authentication packet in a wireless signal transmitted from the intermediate authenticated device, and wherein transmitting comprises wirelessly transmitting the Layer 3 packets to the device seeking authentication.

12. The method of claim 9, wherein receiving the Layer 2 authentication packet comprises receiving the Layer 3 packets encapsulated with an IP address of the authenticated device.

13. An apparatus comprising:
   a transceiver unit configured to transmit and receive signals over a wireless mesh network, and receive, from a device that is seeking authentication in the wireless mesh network, a Layer 2 authentication packet; and
   a processor coupled to the transceiver unit, the processor configured to:
   determine a reliability of transmission in the wireless mesh network;
   select a retransmission protocol based on the determined reliability; and
   encapsulate, according to the selected retransmission protocol, and encrypt the authentication packet using a group mesh key into Layer 3 packets for transmission over an Internet Protocol (IP) tunnel to an authenticator device associated in the network, wherein the IP tunnel includes at least one intermediate authenticated device configured to drop authentication packets not encrypted with the group mesh key.

14. The apparatus of claim 13, wherein the device that is seeking authentication behaves the same as if it were communicating directly with the authenticator device.

15. The apparatus of claim 13, wherein the processor is configured to encapsulate the authentication packet using the IP address of the apparatus.

16. The apparatus of claim 13, wherein the processor is configured to transmit the authentication packet over the IP tunnel across a plurality of intermediate hops to the authenticator device, wherein the plurality of intermediate hops includes the intermediate authenticated device and at least one other authenticated device.

17. The apparatus of claim 13, wherein the processor is configured to control the transceiver unit to transmit the Layer 3 packets encapsulating the authentication packet over an IPv6 tunnel.

18. The apparatus of claim 13, wherein the processor is configured to, for an authentication packet encapsulated in Layer 3 packets received from the authenticator device over the IP tunnel, decapsulate the authentication packet from the Layer 3 packets and to control the transceiver unit to transmit the authentication packet over the network to the device seeking authentication.

19. The apparatus of claim 18, wherein the transceiver unit is a wireless transceiver unit configured to wirelessly transmit and receive signals over the network.

20. One or more non-transitory computer readable storage media encoded with software comprising computer executable instructions and when the software is executed on an authenticated device, operable to:
receive a Layer 2 authentication packet from a device seeking authentication in a wireless mesh network;
determine a reliability of transmission in the wireless mesh network;
select a retransmission protocol based on the determined reliability; and
encapsulate according to the selected retransmission protocol, and encrypt the authentication packet using a group mesh key into Layer 3 packets for transmission over an Internet Protocol (IP) tunnel to an authenticator device associated in the network, wherein the IP tunnel includes at least one intermediate authenticated device configured to drop authentication packets not encrypted with the group mesh key.

21. The computer readable storage media of claim 20, wherein the device that is seeking authentication behaves the same as if it were communicating directly with the authenticator device.

22. The computer readable storage media of claim 20, wherein the instructions that are operable to encapsulate comprise instructions operable to encapsulate the authentication packet using the IP address of the authenticated device.

23. The computer readable storage media of claim 20, wherein the instructions are operable to transmit the authentication packet over the IP tunnel across a plurality of intermediate hops to the authenticator device, wherein the plurality of intermediate hops includes the intermediate authenticated device and at least one other authenticated device.

24. The computer readable storage media of claim 20, and further comprising instructions that are operable to, for an authentication packet encapsulated in Layer 3 packets received from the authenticator device over the IP tunnel, decapsulate the authentication packet from the Layer 3 packets and to control a transceiver unit to transmit the authentication packet to the device seeking authentication.

* * * * *